United States Patent
Tamada

(10) Patent No.: US 11,174,035 B2
(45) Date of Patent: Nov. 16, 2021

(54) HYBRID FLIGHT VEHICLE

(71) Applicant: Honda Motor Co., Ltd., Tokyo (JP)

(72) Inventor: Shunichiro Tamada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 205 days.

(21) Appl. No.: 16/660,593

(22) Filed: Oct. 22, 2019

(65) Prior Publication Data

US 2020/0156801 A1 May 21, 2020

(30) Foreign Application Priority Data

Nov. 15, 2018 (JP) ............................. JP2018-214791

(51) Int. Cl.
| | | |
|---|---|---|
| B64D 35/08 | (2006.01) | |
| B64C 27/32 | (2006.01) | |
| B64D 27/10 | (2006.01) | |
| B64C 27/14 | (2006.01) | |
| B64D 27/24 | (2006.01) | |
| B64D 27/02 | (2006.01) | |

(52) U.S. Cl.
CPC .............. *B64D 35/08* (2013.01); *B64C 27/14* (2013.01); *B64C 27/32* (2013.01); *B64D 27/10* (2013.01); *B64D 27/24* (2013.01); *B64D 2027/026* (2013.01)

(58) Field of Classification Search
CPC ......... B64C 27/14; B64C 27/32; B64D 35/08; B64D 27/10; B64D 27/24; B64D 2027/026
See application file for complete search history.

(56) References Cited

U.S. PATENT DOCUMENTS

| | | | |
|---|---|---|---|
| 3,053,324 A | * 9/1962 | Morley | ................... B64C 27/14 416/21 |
| 2009/0145998 A1 | 6/2009 | Salyer | |
| 2017/0210481 A1 | * 7/2017 | Bak | ......................... B64D 27/24 |
| 2017/0225573 A1 | * 8/2017 | Waltner | ................. B64D 27/24 |
| 2018/0354615 A1 | * 12/2018 | Groninga | ................ B64C 15/12 |
| 2019/0118943 A1 | * 4/2019 | Machin | ................. B64C 39/024 |
| 2020/0039657 A1 | * 2/2020 | Ransom | ................... H02K 7/14 |
| 2020/0148374 A1 | * 5/2020 | Kawai | ..................... B64C 29/00 |
| 2020/0148376 A1 | * 5/2020 | Kawai | ..................... B64C 27/20 |

* cited by examiner

*Primary Examiner* — Rodney A Bonnette
(74) *Attorney, Agent, or Firm* — Duft & Bornsen, PC

(57) ABSTRACT

In a hybrid flight vehicle, having four rotors configured to produce thrust to propel a frame, a gas turbine engine incorporating a compressor and a first turbine adapted to rotate integrally with the compressor, a generator configured to generate electric power, a battery configured to store power generated by the generator, four motor-generators connected to the battery and the multiple rotors to drive the rotors when power is supplied from the battery, while generating power when driven by the rotors. In the vehicle, there is provided a second turbine provided independently of the gas turbine engine and configured to drive the rotors when supplied high pressure gas outputted from the gas turbine engine.

7 Claims, 7 Drawing Sheets

HYBRID FLIGHT VEHICLE

CROSS-REFERENCE TO RELATED APPLICATION

This application is based upon and claims the benefit of priority from Japanese Patent Application No. 2018-214791 filed on Nov. 15, 2018, the contents of which are incorporated herein by reference.

BACKGROUND OF THE INVENTION

Field of the Invention

This invention relates to a hybrid flight vehicle and more particularly to a hybrid flight vehicle equipped with multiple rotors driven by a gas turbine engine or driven by electric power generated by a generator driven by a gas turbine engine.

United States Patent Application Publication US 2009/0145998 A1 teaches technology related to a hybrid flight vehicle of the aforesaid type. The technology set out in the reference is configured to use a turbine to extract rotation from high-pressure gas generated by a gas turbine engine and to directly drive rotors using the extracted rotation or drive rotors using electric power generated by a generator driven by the extracted rotation.

Although the technology of the reference is configured to drive rotors using rotation extracted by means of a turbine from high-pressure gas (energy) generated by a gas turbine engine or by using electric power obtained by driving a generator, the technology merely extracts turbine rotation from the high pressure gas and does nothing else with the high pressure gas other than exhaust it, and as such, leaves a problem regarding thermal efficiency.

SUMMARY OF THE INVENTION

Therefore, as regards a hybrid flight vehicle equipped with multiple rotors driven by a gas turbine engine or driven by electric power generated by a generator driven by a gas turbine engine, an object of this invention is to overcome the aforesaid problem by providing a hybrid flight vehicle capable of improving thermal efficiency of high pressure gas generated by the gas turbine engine.

In order to achieve the object, this invention provides a hybrid flight vehicle, comprising: a frame; multiple rotors configured to produce thrust to propel the frame; each of the multiple rotors having a rotating shaft; a gas turbine engine attached to the frame and incorporating a compressor and a first turbine adapted to rotate integrally with the compressor, the gas turbine engine having an output shaft; a generator connected to the output shaft of the gas turbine engine and configured to generate electric power; a battery configured to store power generated by the generator; multiple motor-generators connected to the battery and the rotating shafts of the multiple rotors, the multiple motor-generators being configured to drive the multiple rotors when power is supplied from the battery, while generating power when driven by the multiple rotors; and a second turbine provided independently of the gas turbine engine and configured to drive the multiple rotors when supplied high pressure gas outputted from the gas turbine engine.

BRIEF DESCRIPTION OF THE DRAWINGS

The objects and advantages of the present invention will become clearer from the following description of embodiments in relation to the attached drawings, in which.

DETAILED DESCRIPTION OF THE INVENTION

In the following, the hybrid flight vehicle according to this invention is explained with reference to the attached drawings in the following.

First Embodiment

Figure 1:
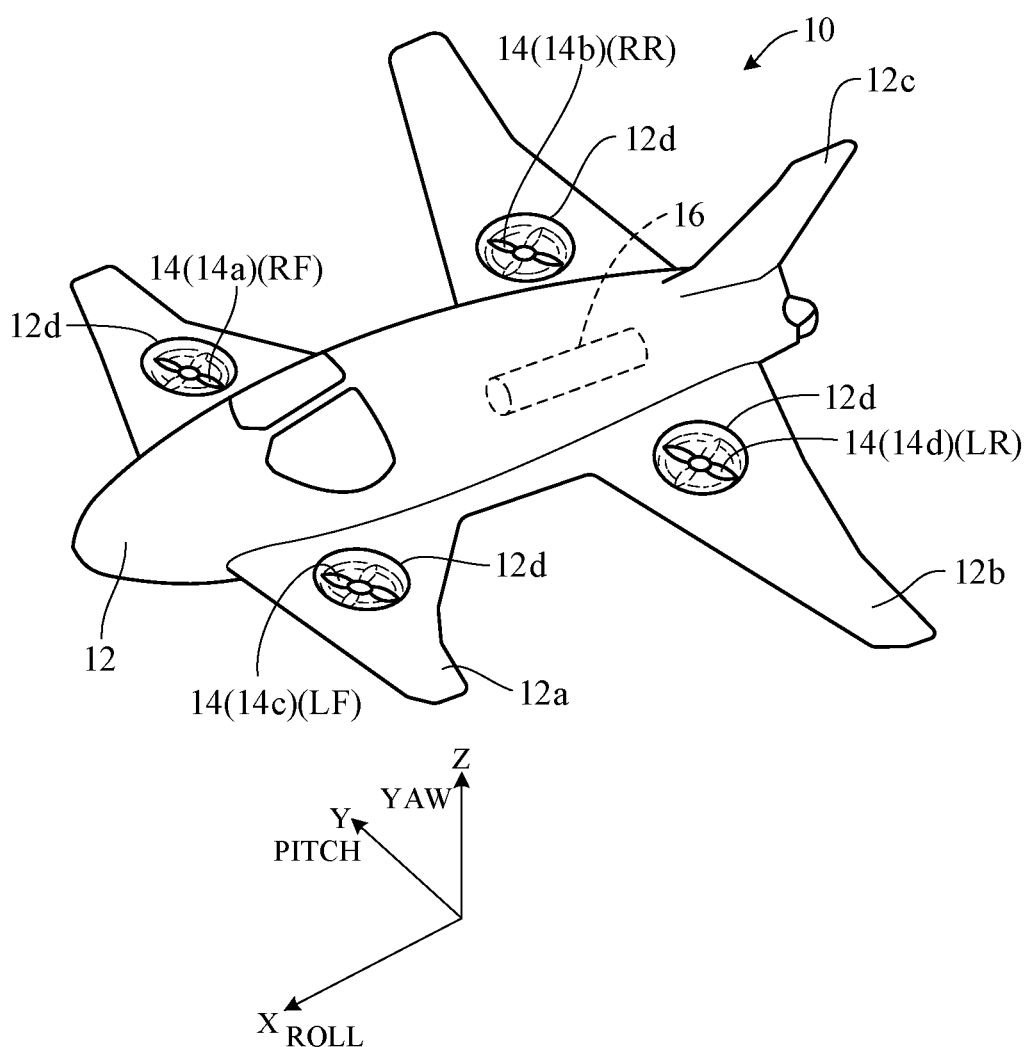
FIG. 1 is a perspective diagram showing an overall view of a hybrid flight vehicle according to a first embodiment of this invention.
Figure 2:
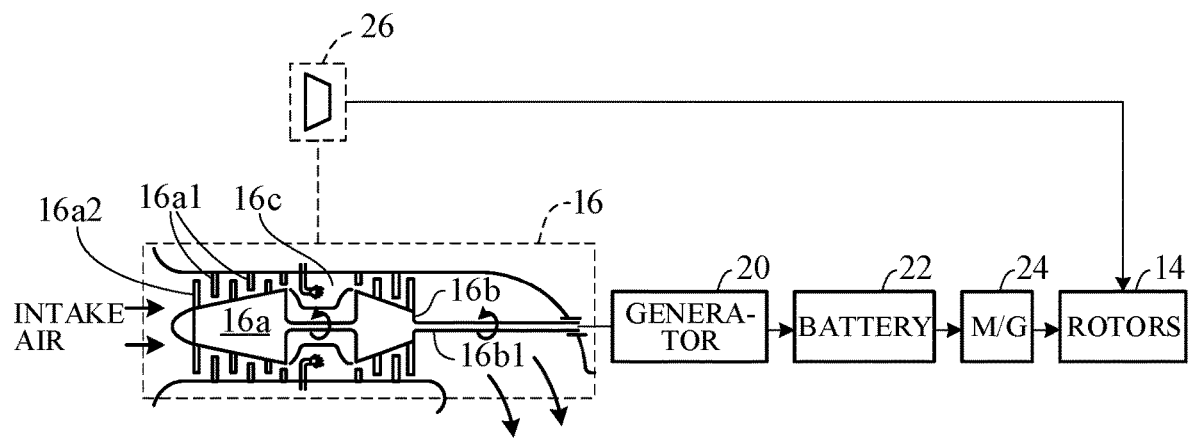
FIG. 2 is an explanatory cross-sectional diagram of, inter alia, a gas turbine engine accommodated in a frame of the hybrid flight vehicle of FIG. 1.
Figure 3:
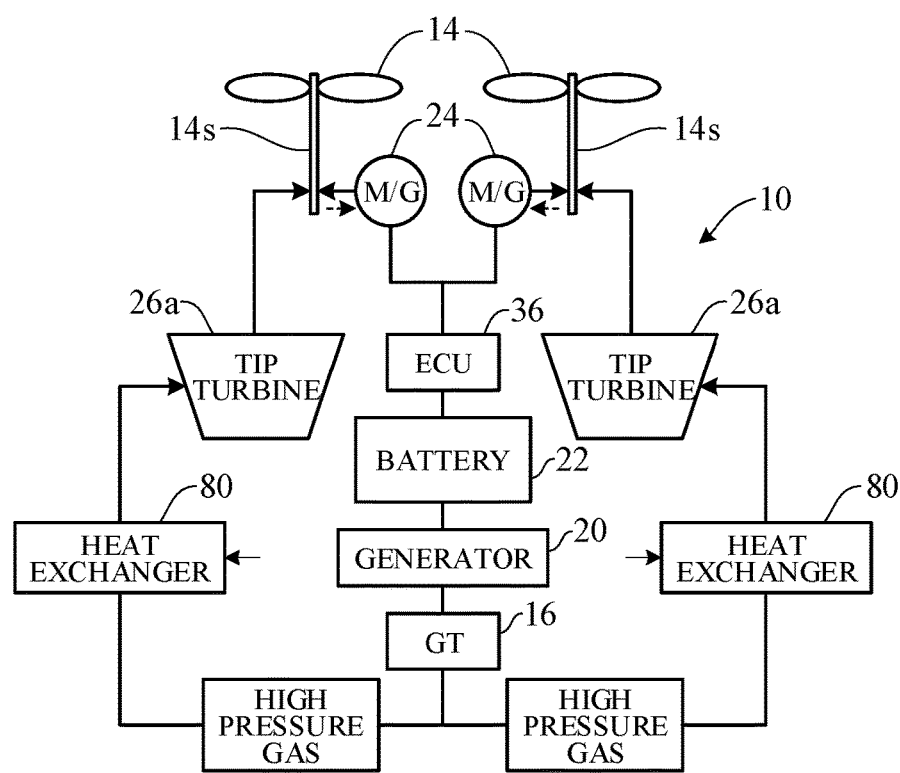
FIG. 3 is a block diagram overviewing constituent elements including the gas turbine engine of the hybrid flight vehicle of FIG. 2.

FIG. 1 is a perspective diagram showing an overall view of a hybrid flight vehicle according to a first embodiment of this invention; FIG. 2 is an explanatory cross-sectional diagram of, inter alia, a gas turbine engine accommodated in a frame of the hybrid flight vehicle of FIG. 1; and FIG. 3 is a block diagram overviewing constituent elements including the gas turbine engine of the hybrid flight vehicle of FIG. 2.

Reference numeral 10 in FIG. 1 and other drawings designates a hybrid flight vehicle (hereinafter called simply "flight vehicle" or "vehicle"). The flight vehicle 10 comprises a frame 12, multiple (four) rotors (fans, propellers) 14 configured to produce thrust to propel the frame 12 (flight vehicle 10), a gas turbine engine (hereinafter sometimes called "GT") 16 attached to the frame 12 and incorporating a compressor and a first turbine 16b adapted to rotate integrally therewith, a generator 20 connected to an output shaft of the GT 16 and configured to generate electric power, a battery 22 configured to store power generated by the generator 20, and multiple (four) motor-generators (designated M/G in the drawings) 24 connected to the battery 22 and configured to rotate rotating shafts 14s of the rotors 14, and further comprises a second turbine 26, provided independently of the GT 16, that when supplied high pressure gas outputted from the GT 16 drive the rotors 14.

As seen in FIG. 1, the frame 12 is of winged vehicle shape exhibiting generally oval form provided with relatively short main wings 12a, horizontal tail wings 12b longer than the main wings 12a, and a vertical tail wing 12c rising from near rear end of the horizontal tail wings 12b.

The main wings 12a and horizontal tail wings 12b are formed with a total of four annular nacelles 12d, each of which internally accommodates one of the four rotors 14 driven by the aforesaid GT 16, and one of the motor-generators 24. Although not shown, a total of four forward and rearward seats, namely, forward pilot (cockpit) seats and rearward passenger seats, are provided near the middle of the frame 12. The flight vehicle 10 is structured to enable Vertical Take-Off and Landing of the frame 12.

The four rotors 14 are formed in the main wings 12a and horizontal tail wings 12b, and each rotor 14 has the rotational shaft 14s whose axis lying parallel to yaw axis (Z axis; gravity axis) and is configured as a single-blade fixed pitch propeller of known shape. The four rotors 14 actually comprise a right front (RF) unit 14a, a right rear (RR) unit 14b, a left front (LF) unit 14c and a left rear (LR) unit 14d. Where the number of rotors 14 is defined as $2n$ (n≥2), the number (n) of rotors 14 is not limited to n=2 but can instead be n=3, n=4, or the like.

The GT 16 is a conventional turboshaft engine like that shown in FIG. 2 comprising a compressor 16a, a turbine (first turbine) 16b that rotates integrally with the compressor 16a, and a combustion chamber 16c formed therebetween. As shown in FIG. 1, an output shaft of the GT 16 (turbine output shaft 16b1) is attached (installed) parallel to roll axis (X axis) of the frame 12.

The compressor 16a comprises stator vanes 16a1 and moving vanes 16a2 configured to compress intake air drawn in through an air intake port (not shown) formed in the frame 12. The compressor 16a and first turbine 16b are connected and integrally rotated by high pressure gas generated by combustion of fuel in the combustion chamber 16c. Generated high pressure gas is discharged to outside the frame 12 through an exhaust port (not shown) formed in the frame 12.

An output shaft 16b1 of the first turbine 16b (turbine output shaft, i.e., GT 16 output shaft) is connected to and drives the generator 20 through a suitable reduction mechanism (not shown). When driven by the first turbine 16b, the generator 20 generates electricity (AC power).

Power generated by the generator 20 is converted to DC power by a converter of a PDU (Power Drive Unit; not shown) and stored in the battery 22. Power discharged from the battery 22 is converted to AC through an inverter of the PDU and supplied as AC power to the four motor-generators 24 installed one on each of the four rotors 14.

The motor-generators 24 are brushless DC motors that on the one hand rotate to drive the rotors 14 when current is sequentially supplied to their three phase coils (not shown) and on the other generate power when driven by the rotors 14. Power generated by the motor-generators 24 is stored in the battery 22 via the PDU. Only two of the four rotors 14 are illustrated in FIG. 3.

In actual implementation, the second turbine 26 comprise a plurality of tip turbines 26a configured to operate by supply of high pressure gas extracted from near the stator vanes 16a1 of the compressor 16a of the GT 16.

Figure 4:
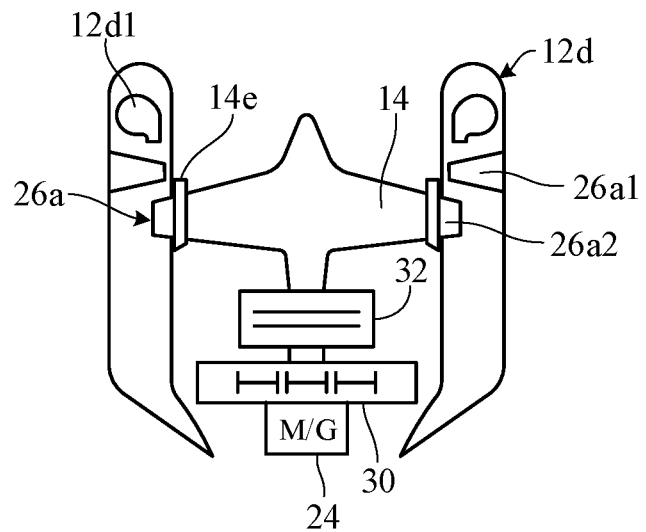
FIG. 4 is an explanatory cross-sectional diagram of and around one of the tip turbines of FIG. 3.
Figure 5:
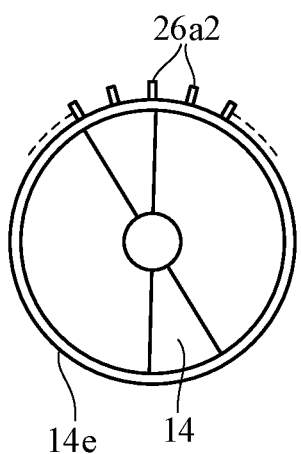
FIG. 5 is an explanatory plan view of the tip turbine and vicinity of FIG. 4.
Figure 6:
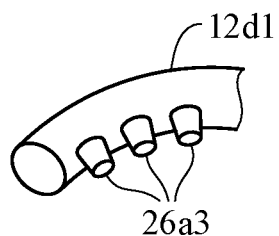
FIG. 6 is a diagram showing an enlarged partial view of the tip turbine of FIG. 4.
Figure 7:
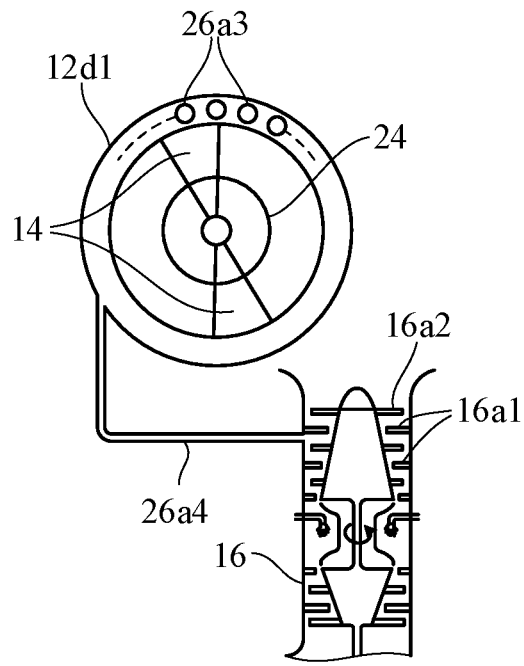
FIG. 7 is an explanatory diagram showing, inter alia, extraction stream from the gas turbine engine to the tip turbine of FIG. 4.

FIG. 4 is an explanatory cross-sectional diagram of and around one of the tip turbines 26a; FIG. 5 is an explanatory plan view of the tip turbine 26a and vicinity; FIG. 6 is a diagram showing an enlarged partial view of the tip turbine 26a; and FIG. 7 is an explanatory diagram showing, inter alia, extraction stream from the GT 16 to the tip turbine 26a.

As illustrated, the tip turbines 26a are accommodated one in each of the annular nacelles 12d accommodating the rotors 14. Specifically, each tip turbine 26a is installed inside its annular nacelle 12d accommodating the associated rotor 14 and comprises stator vanes 26a1 formed on inner wall of the nacelle 12d and moving vanes 26a2 installed between the stator vanes 26a1 and a shroud 14e formed facing the stator vanes 26a at distal end of the rotors 14.

Moreover, as shown in FIG. 4 to FIG. 7, an annular duct 12d1 is formed in the inner periphery of the nacelle 12d. The duct 12d1 is provided with jetting ports 26a3 opening near the stator vanes 16a1 of the compressor 16a of the GT 16 and an extraction stream passage 26a4 configured to extract generated high pressure gas from the compressor 16a, whereby extracted high pressure gas passes through the extraction stream passage 26a4 to be jetted from the jetting ports 26a3.

Owing to this configuration, when high pressure gas generated by the moving vanes 16a2 of the compressor 16a of the GT 16 is supplied through the extraction stream passage 26a4 and jetting ports 26a3, the tip turbine 26a rotates along with (following) rotation of the compressor 16a of the GT 16 to thereby drive the rotor 14. The tip turbine 26a has about forty stator vanes 26a1 and forty moving vanes 26a2.

As indicated in FIG. 4, output of the motor-generator 24 is inputted to the associated rotor 14 through a speed reducer 30 and a clutch 32, and output of the tip turbine 26a is applied to the associated rotor 14 directly.

Returning to the explanation of FIG. 3, the flight vehicle 10 is equipped with an electronic control unit (hereinafter sometimes called "ECU") 36 configured to control flight by regulating driving of the rotors 14 by the GT 16 and motor-generators 24 in accordance with output from an FADEC (Full Authority Digital Electronic Control; not shown) installed in the cockpit.

Figure 8:
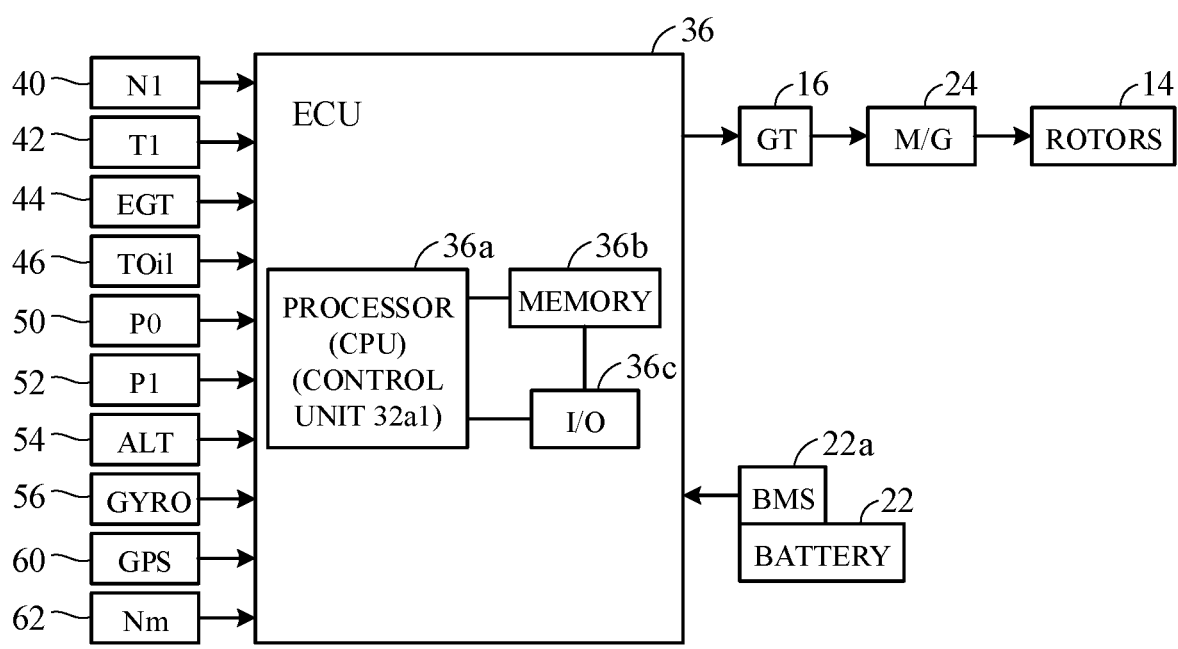
FIG. 8 is a block diagram focused on a control unit and associated sensors of FIG. 3.

FIG. 8 is a block diagram focused on the ECU (control unit) 36 of FIG. 3 and associated sensors.

As indicated in FIG. 8, the ECU 36 is a microcomputer comprising at least one processor (CPU 36a), memories 36b, including ROM and RAM coupled to the processor, and an I/O unit 36c, and is installed at a suitable location as accommodated in a container.

Turning to an explanation of the various sensors, a rotational speed sensor 40 installed near the turbine output shaft 16b1 of the GT 16 outputs a signal indicating turbine rotational speed N1. A temperature sensor 42 installed near the air intake port formed in the frame 12 outputs a signal indicating GT inlet temperature T1, and a second temperature sensor 44 installed at a suitable location downstream of the combustion chamber 16c outputs a signal indicating exhaust gas temperature EGT. A third temperature sensor 46 installed at a suitable part of a lubricating oil supply system (not shown) outputs a signal indicating lubricant temperature Toil.

Further, a pressure sensor 50 installed inside the container housing the ECU 36 outputs a signal indicating atmospheric pressure P0, and a second pressure sensor 52 installed near the air intake port of the GT 16 outputs a signal indicating GT inlet pressure P1.

Further, an altimeter (ALT) 54 installed on the frame 12 produces an output indicating altitude ALT of the flight vehicle 10, and a gyrosensor 56 installed at an appropriate location on the frame 12 produces an output indicating angle of inclination of the frame 12 relative to Z axis (yaw axis) among absolute X, Y and Z coordinate axes (shown in FIG. 1).

Moreover, a GPS receiver 60 provided at a suitable location on the frame 12 uses signals received from a group of satellites to produce an output indicating position of the flight vehicle 10. Further, four rotational speed sensors 62 installed one near the rotating shaft of each of the motor-generators 24 installed at the four rotors 14 produce outputs indicating rotational speeds Nm of the motor-generators 24, while the battery 22 is equipped with a BMS (Battery Management System) 22a that produces an output indicating SOC (State of Charge; residual).

Outputs of the aforesaid sensors are sent to the ECU 36 and the FADEC (not shown). The ECU 36 is responsive to pilot instructions received via the FADEC configured to detect operating condition of the second turbines 26 (tip turbines 26a) and controlling driving of the rotors 14, and also, as required, configured to control flight of the flight vehicle 10 by using the second turbine 26 to assist the motor-generators 24 drive the rotors 14.

Figure 9:
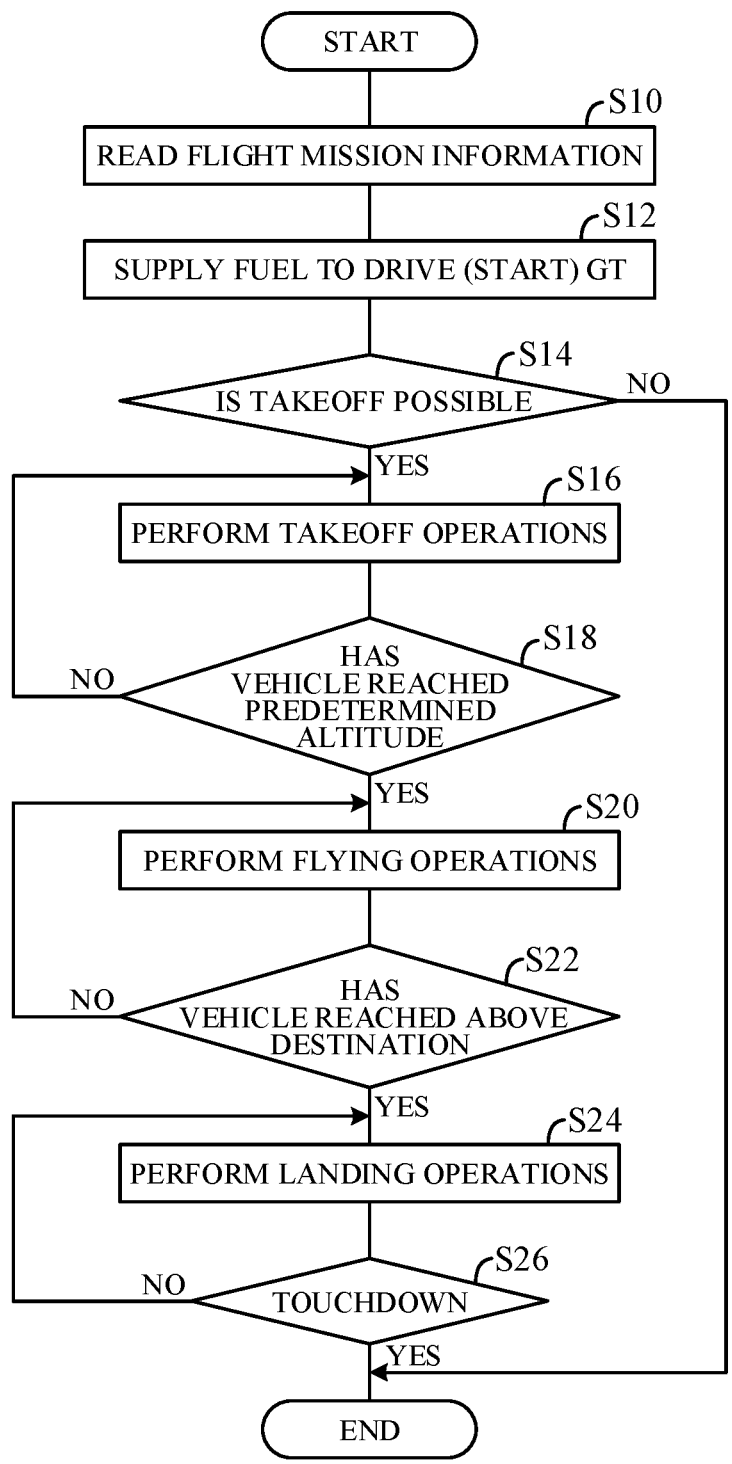
FIG. 9 is a flowchart showing operations of the control unit of FIG. 8 associated with operations of the flight vehicle according to this embodiment.
Figure 10:
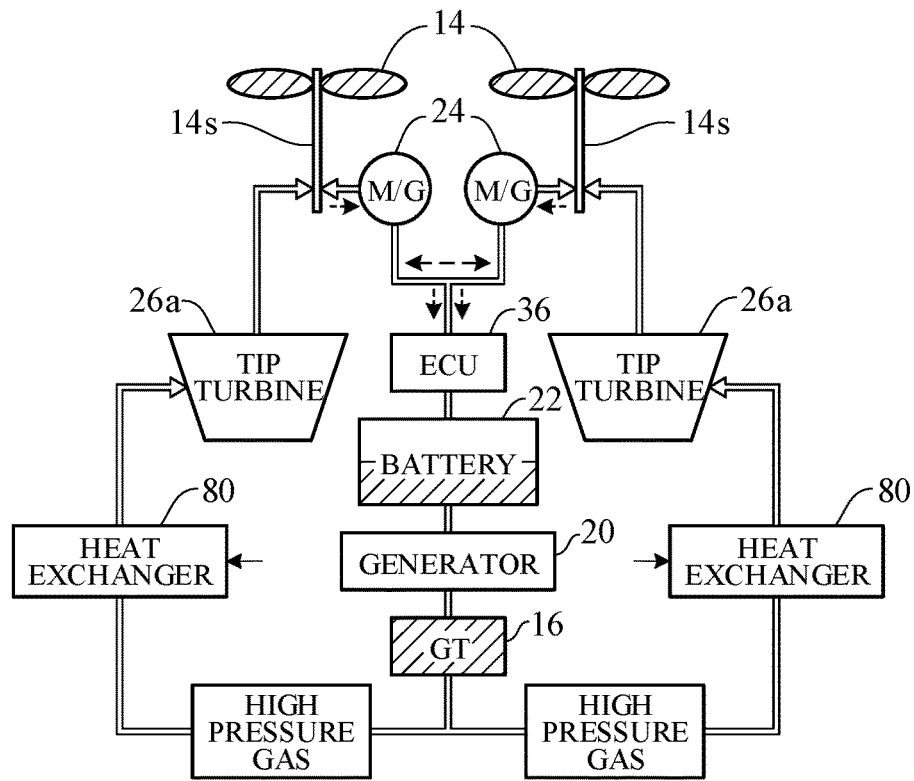
FIG. 10 is block diagrams, similar to that of FIG. 3, but showing operations of the flight vehicle during takeoff/landing and turning.
Figure 11:
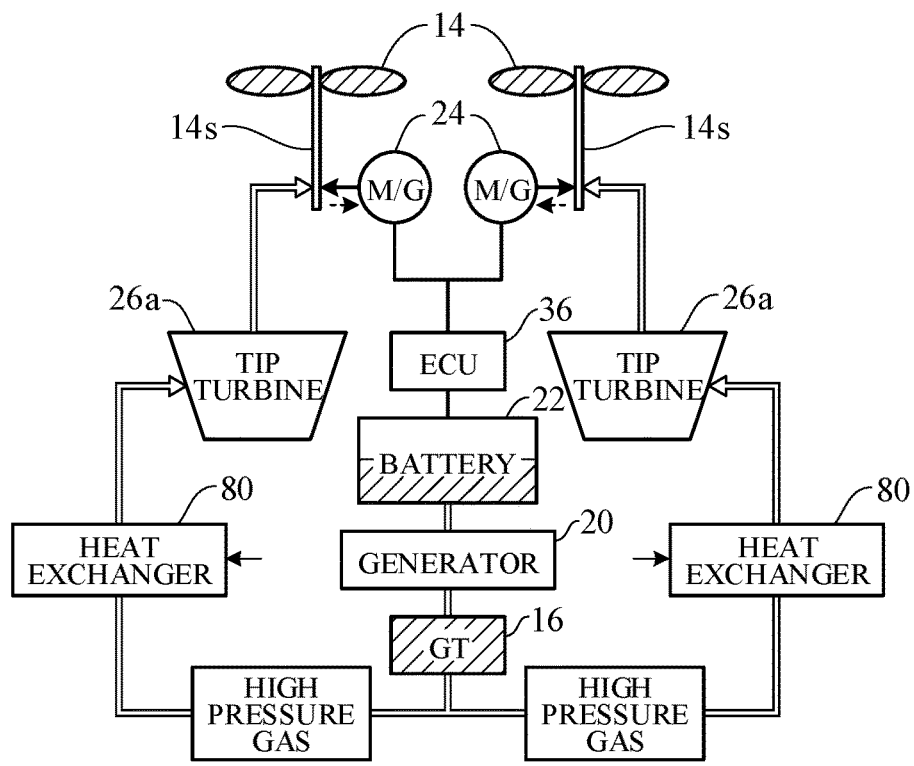
FIG. 11 is block diagrams, similar to that of FIG. 3, but showing operations of the flight vehicle during cruising.
Figure 12:
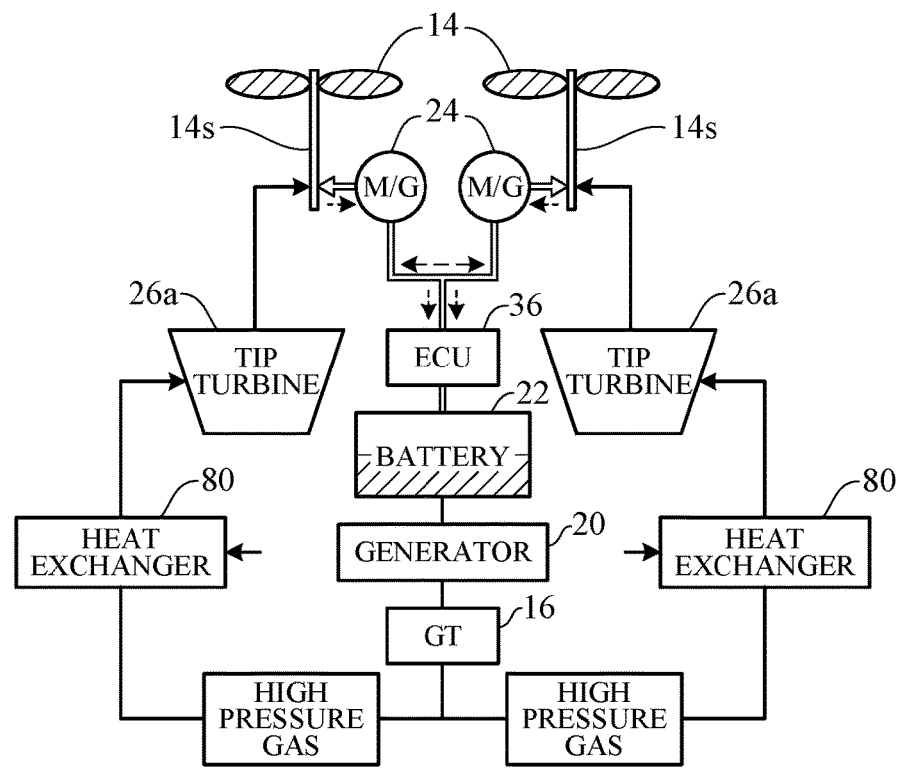
FIG. 12 is block diagrams, similar to that of FIG. 3, but showing operations of the flight vehicle during battery-only powered flight.

FIG. 9 is a flowchart showing operations of the ECU 36 associated with operations of the flight vehicle 10 according to this embodiment; and FIGS. 10 to 12 are block diagrams similar to that of FIG. 3 showing operations of the flight vehicle 10 during takeoff/landing and turning, during cruising, and during batter-only powered flight.

First, in S10 (S: processing Step), destination, flight course and other aspects of a flight mission input (instructed) by the pilot are read, whereafter the program goes to S12 to supply fuel to and drive (start) the GT 16.

Next, in S14, it is determined whether takeoff is possible. When the result is NO the remaining steps are skipped, and when YES, the program goes to S16 to perform takeoff.

The flight vehicle 10 is configured to maintain horizontal posture by using the tip turbines 26a (second turbine 26) alone or together with the motor-generators 24 to rotate one set among the four rotors 14, e.g., rotors 14a and 14d, in one direction, e.g., CW (clockwise), and another set comprising rotors 14b and 14c in opposite direction CCW (counterclockwise).

As indicated in FIG. 10, required lift is obtained during takeoff by performing control to uniformly increase rotational speed of the four rotors 14 with assist rotation of the motor-generators 24 in addition to the second turbine 26.

In FIGS. 10 to 12, hatching of the battery 22 indicates, by size thereof, degree of SOC, and hatching of other elements indicates their being in operation. Moreover, thick lines and thin lines connected between elements (equipment units) respectively indicate transmission and no transmission of driving power. As mentioned earlier regarding FIG. 3, only two of the four rotors 14 are illustrated.

The program next goes to S18, in which it is determined based on output of the altimeter 54 whether the flight vehicle 10 has reached predetermined altitude, i.e., whether takeoff was achieved, and when the result is NO, the program returns to S16, and when YES, goes to S20, in which flight control is performed.

Flight control is performed in accordance with pilot instructions so as to fly toward the inputted designation while finely adjusting posture of the frame 12 based on output of the gyrosensor 56. For example, flight direction is controlled by reducing rotational speed of the two forward rotors 14a and 14c among the four rotors 14 and increasing rotational speed the two rearward rotors 14b and 14d.

When turning, to the right for example, is to be performed, driving of the rotors 14 is controlled so that rotational speed of the two right side rotors 14a and 14b among the four rotors 14 is reduced and rotational speed of the two left side rotors 14c and 14d is increased, whereby the frame 12 is turned in desired direction by reaction force of the rotors 14 on the side of higher rotational speed.

In actual practice, as illustrated in FIG. 10, control is performed to apply to the rotors 14 on the side whose rotor rotational speed is to be increased not only with output of the tip turbines 26a but also with additionally rotation of the motor-generators 24. Degree of turning is adjusted by increasing/decreasing rotational speed of the rotors 14 by the motor-generators 24. This enables effective driving of the rotors 14.

In rotation control (control of rotation around yaw axis), CCW rotation of the frame 12 is performed by increasing rotational speed of, for example, the CW rotation side rotors 14a and 14d among the rotors 14 and lowering rotational speed CCW side rotors 14b and 14c. CW rotation of the frame 12 is performed in reverse from the aforesaid.

Further, during straight flying at low speed in cruise mode, driving force of the rotors 14 is made lower than during turning and takeoff, so, as indicated in FIG. 11, driving by the motor-generator 24 is stopped and the rotors 14 are driven solely by the second turbine 26 (multiple tip turbines 26a), thereby achieving improved energy efficiency.

Moreover, as the flight vehicle 10 is of winged vehicle shape equipped with, inter alia, the main wings 12a and the horizontal tail wings 12b, it has a configuration capable of short-term gliding descent. It is therefore alternatively possible, as indicated in FIG. 12, to stop driving by the GT 16 and drive the rotors 14 using only the motor-generators 24 powered by power stored in the battery 22. This enables similar improvement in energy efficiency.

Returning to the flowchart of FIG. 9, next, in S22, it is determined from output of the GPS receiver 60 and the like whether a point above the destination has been reached, and when the result is NO, the program returns to S20, and when YES, goes to S24, in which control transitions to landing mode.

Landing is performed by gradually decreasing rotational speed of all of the four rotors 14 until touchdown is determined from output of a WOW (Weight-on-Wheel) and other sensors (not shown) in S26. Specifically, as indicated in FIG. 10, rotational speed of the rotors 14 is lowered by causing them to drive the motor-generators 24 to perform regeneration (generate electricity).

There now follows an explanation with reference to FIG. 3 of a heat exchanger 80 installed between the GT 16 and the tip turbines 26a (second turbine 26).

Owing to installation of the heat exchanger 80 at the indicated locations, temperature of high pressure gas generated by the GT 16 is cooled while being supplied to the tip turbines 26a, whereby thermal load on the shrouds 14e and the like of the tip turbines 26a can be reduced.

Moreover, combustion in the combustion chamber 16c of the GT 16 can be promoted by circulating heat-exchanged high heat to upstream of the compressor 16a of the GT 16, thus enabling a proportional saving of consumed fuel.

In this embodiment, as set out in the foregoing, the flight vehicle 10 equipped with the multiple rotors 14 driven by the GT 16 or driven by electric power generated by the generator 20 driven by GT 16 is configured to incorporate the second turbine 26 (tip turbines 26a) provided independently of the GT 16, thus enabling improved thermal efficiency of high pressure gas generated by the GT 16.

Second Embodiment

Figure 13:
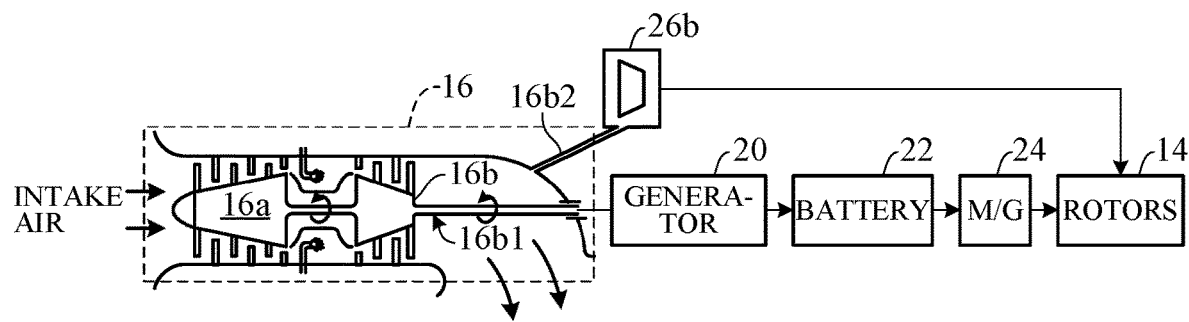
FIG. 13 is an explanatory cross-sectional diagram similar to FIG. 2 of the gas turbine engine, among other constituents, schematically illustrating a hybrid flight vehicle according to a second embodiment of this invention.

FIG. 13 is an explanatory cross-sectional diagram similar to FIG. 2 of the GT 16, among other constituents, schematically illustrating a hybrid flight vehicle according to a second embodiment of this invention.

Turning to an explanation focused on points of difference from the first embodiment, the second embodiment is configured to use as the second turbine 26, a turbine 26b driven by exhaust gas discharged from the GT 16. The turbine 26b is installed independently of the drive system of the generator 20 and is configured as a turbine that can drive the rotors 14 using, for example, exhaust gas introduced through feed passages 16b2 from downstream of the first turbine 16b of the GT 16.

In the second embodiment, as set out in the foregoing, the flight vehicle 10 equipped with the multiple rotors 14 driven by the GT 16 and/or driven by electric power generated by the generator 20 driven by GT 16 is configured to incorporate the second turbine 26 (turbine 26b) provided independently of the GT 16, thus similarly enabling improved thermal efficiency of high pressure gas generated by the GT 16. Other features and effects are no different from those of the first embodiment.

As stated above, the first and second embodiments of the invention are configured to have a hybrid flight vehicle (10), comprising: a frame (12); multiple rotors (14) configured to produce thrust to propel the frame; each of the multiple rotors having a rotating shaft (14s); a gas turbine engine (GT 16) attached to the frame and incorporating a compressor (16a) and a first turbine (16b) adapted to rotate integrally with the compressor, the gas turbine engine having an output shaft (turbine output shaft 16b1); a generator (20) connected to the output shaft (16d1) of the gas turbine engine and configured to generate electric power; a battery (22) configured to store power generated by the generator; multiple motor-generators (M/G 24) connected to the battery and the rotating shafts (14s) of the multiple rotors, the multiple motor-generators being configured to drive the multiple rotors (14) when power is supplied from the battery (22), while generating power when driven by the multiple rotors (14); and a second turbine 26 (multiple tip turbines 26a, a turbine 26b) provided independently of the gas turbine engine and configured to drive the multiple rotors when supplied high pressure gas outputted from the gas turbine engine. With this, it becomes possible to improve thermal efficiency of high pressure gas generated by the GT 16.

The vehicle is configured such that the second turbine (26) comprises multiple tip turbines (26a) 2 accommodated one in each of annular nacelles (12d) housing the multiple rotors (14), the multiple tip turbines (26a) comprising stator vanes (26a1) formed on inner wall of the annular nacelles and moving vanes (26a2) installed between the stator vanes, the multiple tip turbines (26a) being configured to rotate along with rotation of the compressor (16a) of the gas turbine engine (GT 16) to drive the multiple rotors (14) when high pressure gas is supplied through extraction stream passage (26a4). With this, in addition to the advantages and effects, it becomes possible to further improve thermal efficiency by decreasing mechanical loss.

The vehicle is configured such that it further includes: a heat exchanger (80) installed between the gas turbine engine (GT 16) and the second turbine (26). With this, in addition to the advantages and effects, it becomes possible to further improve thermal efficiency and to save consumption fuel.

The vehicle is configured such that the second turbine (26) comprises a turbine (26b) configured to be driven by exhaust gas discharged from the gas turbine engine (GT 16). With this, it becomes possible to improve thermal efficiency similarly.

The vehicle is configured such that it further includes: multiple detectors (a rotational speed sensor 40, etc.) configured to output signals indicating operations of the gas turbine engine (GT 16) and the motor generator (M/G 24); and a control unit (electronic control unit, ECU 36) configured to control flight based on the signals outputted from the detectors. With this, in addition to the advantages and effects, it becomes possible to control the flight of the vehicle (10) appropriately.

The vehicle is configured such that the control unit (ECU 36) operates the motor generator (M/G 24) when the flight is takeoff/landing. With this, it becomes possible to further save consumption fuel.

The vehicle is configured such that the vehicle (10) comprises a vertical take-off and landing vehicle. With this, in addition to the effects and advantages, it becomes possible to carry out takeoff/landing in a smooth manner.

It should be noted in that above that although the flight vehicle 10 is built to carry passengers it can be modified to unmanned vehicle. Further, the generator 20 can also be a motor generator.

While the present invention has been described with reference to the preferred embodiments thereof, it will be understood, by those skilled in the art, that various changes and modifications may be made without departing from the scope of the appended claims.

What is claimed is:

1. A hybrid flight vehicle, comprising:
   a frame;
   multiple rotors configured to produce thrust to propel the frame; each of the multiple rotors having a rotating shaft;
   a gas turbine engine attached to the frame and incorporating a compressor and a first turbine adapted to rotate integrally with the compressor, the gas turbine engine having an output shaft;
   a generator connected to the output shaft of the gas turbine engine and configured to generate electric power;
   a battery configured to store power generated by the generator;
   multiple motor-generators connected to the battery and the rotating shafts of the multiple rotors, the multiple motor-generators being configured to drive the multiple rotors when power is supplied from the battery, while generating power when driven by the multiple rotors; and
   a second turbine provided independently of the gas turbine engine and configured to drive the multiple rotors when supplied high pressure gas outputted from the gas turbine engine.

2. The vehicle according to claim 1, wherein the second turbine comprises multiple tip turbines accommodated one in each of annular nacelles housing the multiple rotors, the multiple tip turbines comprising stator vanes formed on an inner wall of the annular nacelles and moving vanes installed between the stator vanes, the multiple tip turbines being configured to rotate along with rotation of the compressor of the gas turbine engine to drive the multiple rotors when high pressure gas is supplied through an extraction stream passage.

3. The vehicle according to claim 1, further including:
   a heat exchanger installed between the gas turbine engine and the second turbine.

4. The vehicle according to claim 1, wherein the second turbine comprises a turbine configured to be driven by exhaust gas discharged from the gas turbine engine.

5. The vehicle according to claim 1, further including:
multiple detectors configured to output signals indicating operations of the gas turbine engine and the motor generator; and
a control unit configured to control flight based on the signals outputted from the detectors.

6. The vehicle according to claim 5, wherein the control unit operates the motor generator when the flight is takeoff/landing.

7. The vehicle according to claim 1, wherein the vehicle comprises a vertical take-off and landing vehicle.

* * * * *